April 28, 1942. H. T. PLATZ 2,281,323
WELDING EQUIPMENT
Filed May 26, 1938 7 Sheets-Sheet 3
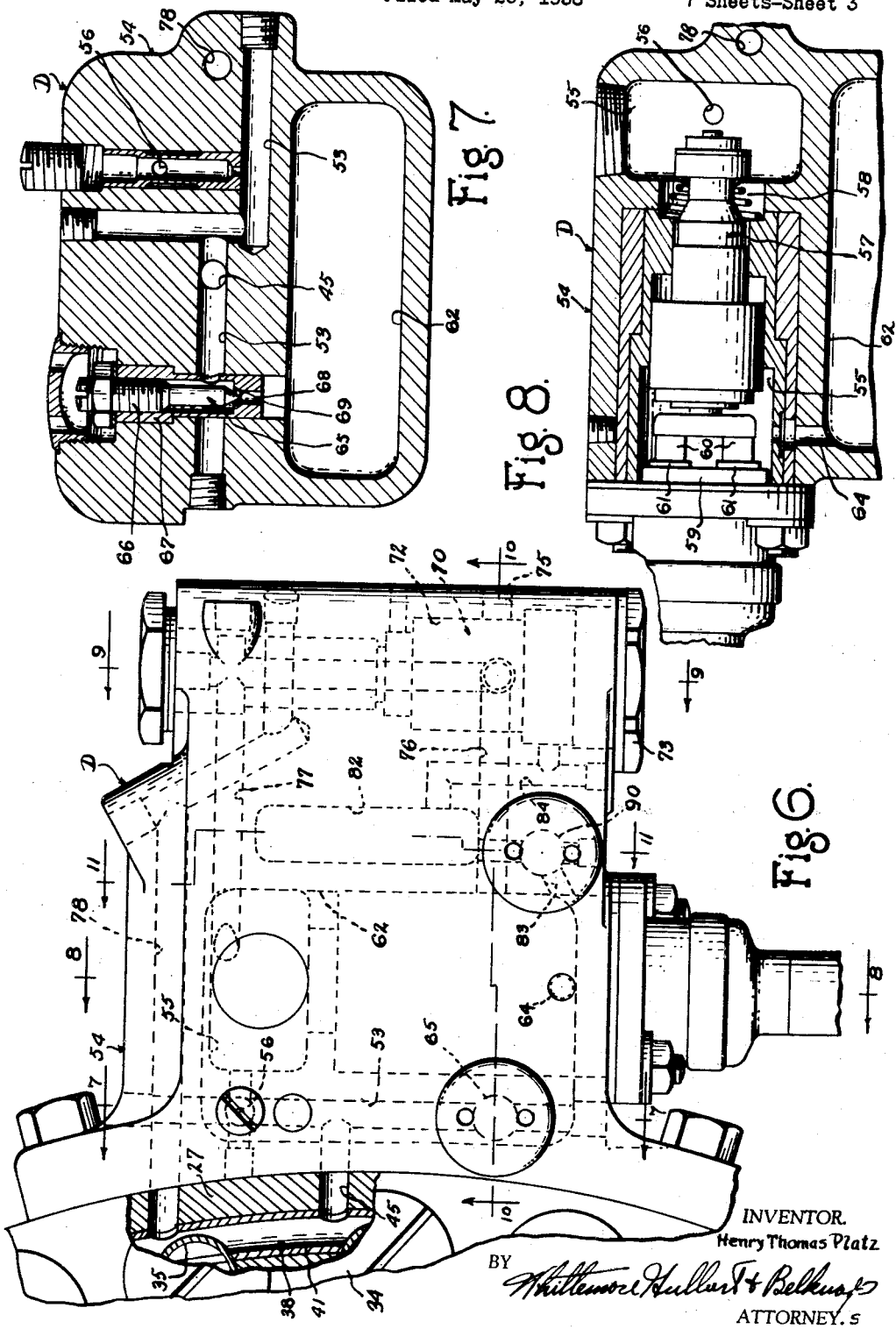
INVENTOR.
Henry Thomas Platz
BY
Whittemore Hulbert & Belknap
ATTORNEYS April 28, 1942.   H. T. PLATZ   2,281,323
WELDING EQUIPMENT
Filed May 26, 1938   7 Sheets-Sheet 4

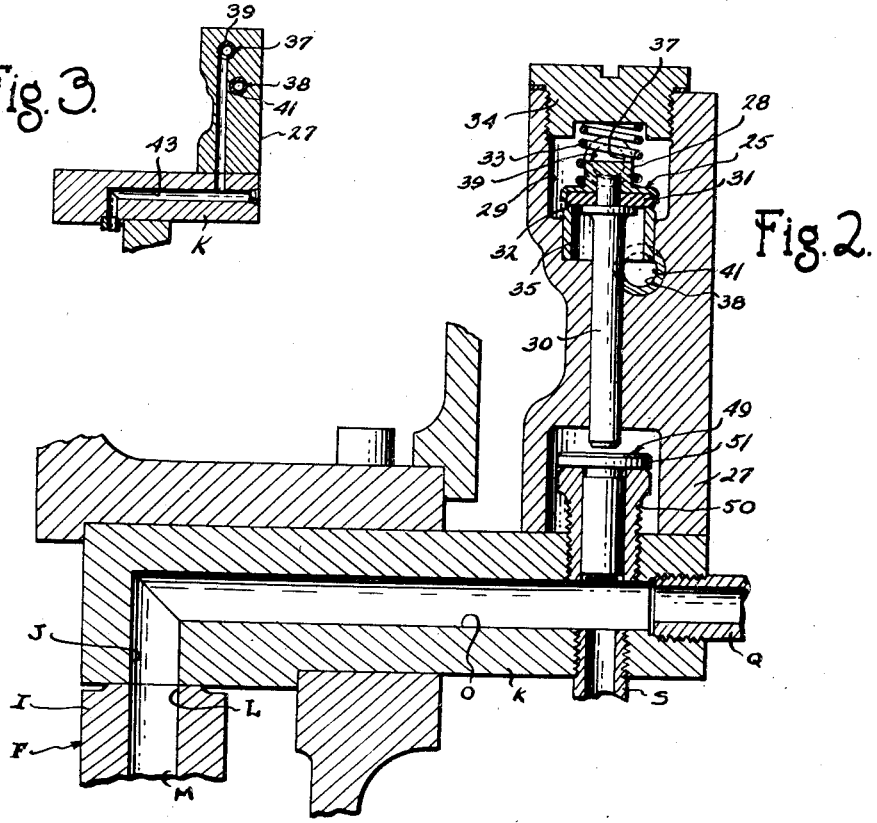
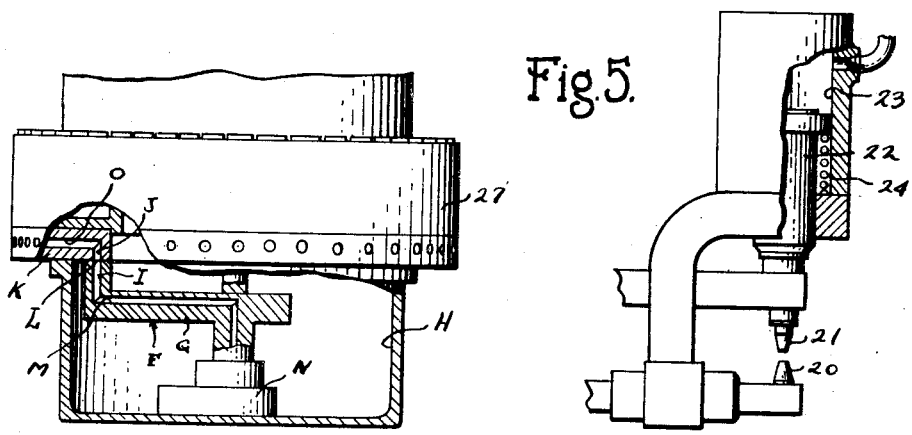

INVENTOR.
Henry Thomas Platz
BY
ATTORNEY.S

April 28, 1942.  H. T. PLATZ  2,281,323
WELDING EQUIPMENT
Filed May 26, 1938  7 Sheets-Sheet 5

INVENTOR.
Henry Thomas Platz
BY
ATTORNEYS

April 28, 1942.　　　H. T. PLATZ　　　2,281,323
WELDING EQUIPMENT
Filed May 26, 1938　　　7 Sheets-Sheet 7

INVENTOR
Henry Thomas Platz
BY
ATTORNEYS

Patented Apr. 28, 1942

2,281,323

UNITED STATES PATENT OFFICE 2,281,323

WELDING EQUIPMENT

Henry Thomas Platz, Detroit, Mich., assignor to Briggs Manufacturing Company, Detroit, Mich., a corporation of Michigan Application May 26, 1938, Serial No. 210,233

32 Claims. (Cl. 219—4)

This invention relates generally to welding equipment and refers more particularly to improvements in control mechanism for electric welders.

One of the principal objects of this invention consists in the provision of means for automatically controlling the operation of the switch in the welding circuit in timed relation to relative movement of the electrodes into and out of engagement with the work to be welded.

Another object of this invention consists in the provision of control means rendering it possible to effect a greater number of welds in less time than heretofore considered practical and at the same time to maintain the timed relation between the operation of the switch and electrodes required to secure effective welds without burning, or otherwise detrimentally affecting the work being welded. The foregoing is rendered possible in accordance with this invention by controlling the operation of the switch with fluid pressure and by insuring rapid exhaust of the fluid pressure at the end of each cycle of operation. By effecting rapid exhaust of the fluid pressure, the time interval between successive operations of the switch may be reduced with the result that a greater number of welds may be obtained in a specified unit of time.

Still another object of the present invention resides in the provision of welding equipment embodying means whereby the electrodes of a plurality of individual welders may be relatively moved into engagement with the work, or whereby a plurality of groups of welders are successively operated in a manner that the electrodes of the welders in each group are simultaneously moved into engagement with the work.

A further advantageous feature of the present invention consists in the provision of welding equipment wherein the welding time of the individual welders, or wherein the welding time of the various groups of welders is automatically and accurately controlled by a single switch.

A still further object of the present invention consists in the provision of welding equipment wherein a plurality of welders, or a series of groups of welders operating on the same or different work pieces may be independently controlled to provide different welding intervals. For example, if certain parts of the work to be welded are of lighter gauge than other portions, it is desirable to reduce the welding time on the thinner portions of the work in order to avoid arcing or burning of the work. This result may be obtained in the present instance by providing a separate switch for the welder, or group of welders acting on the thinner sections of the stock.

In addition to the foregoing, the present invention contemplates the results outlined in the preceding paragraph by merely varying the time interval the circuit to the several welders is closed and does not require interfering with the operation of the electrode actuating means.

The foregoing, as well as other objects, will be made more apparent as this description proceeds, especially when considered in connection with the accompanying drawings, wherein—

Figure 2 is a sectional view taken substantially on the plane indicated by the line 2—2 of Figure 1;

Figure 3 is a sectional view taken substantially on the plane indicated by the line 3—3 of Figure 1;

Figure 4 is a semi-diagrammatic side elevational view, partly in section, of the construction shown in Figure 1;

Figure 5 is a semi-diagrammatic vertical sectional view through one of the welders;

Figure 6 is an enlarged plan view of a portion of the equipment shown in Figure 1 and featuring one of the switch units;

Figure 12:
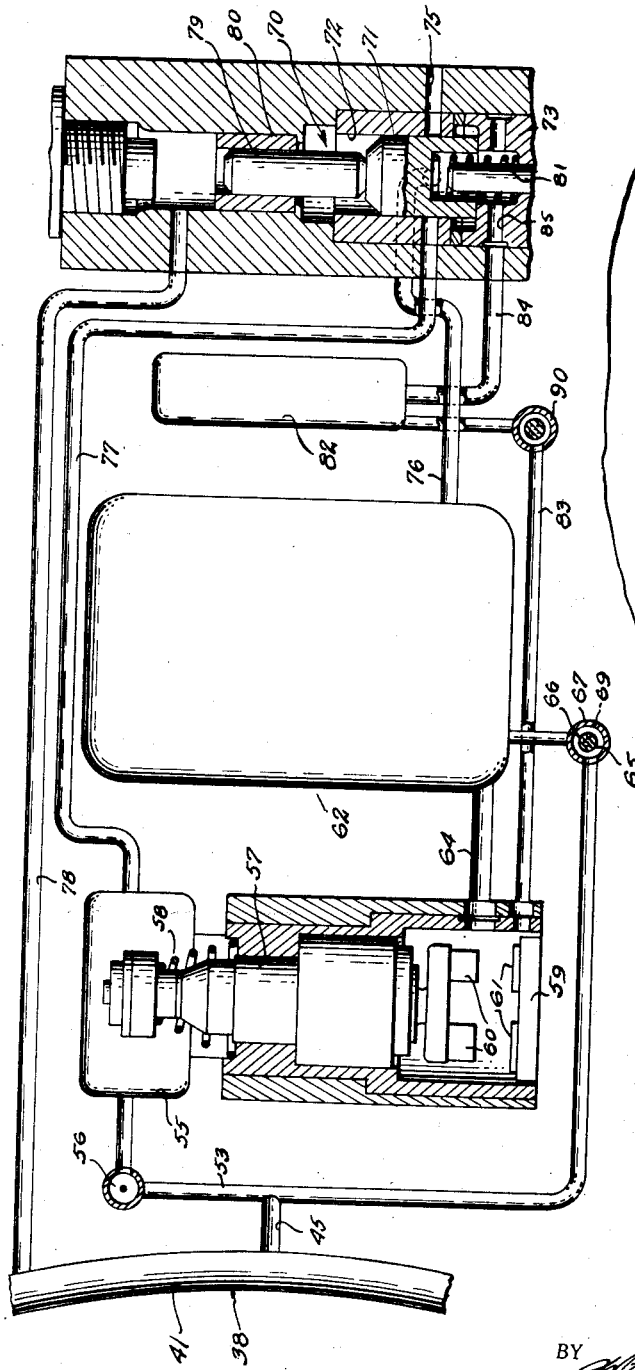
Figure 13:
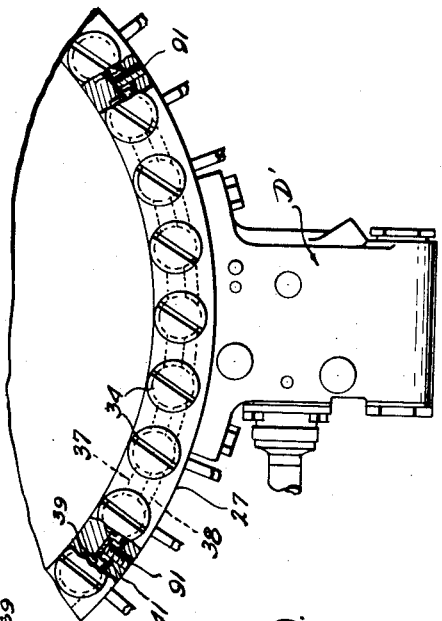
Figure 14:
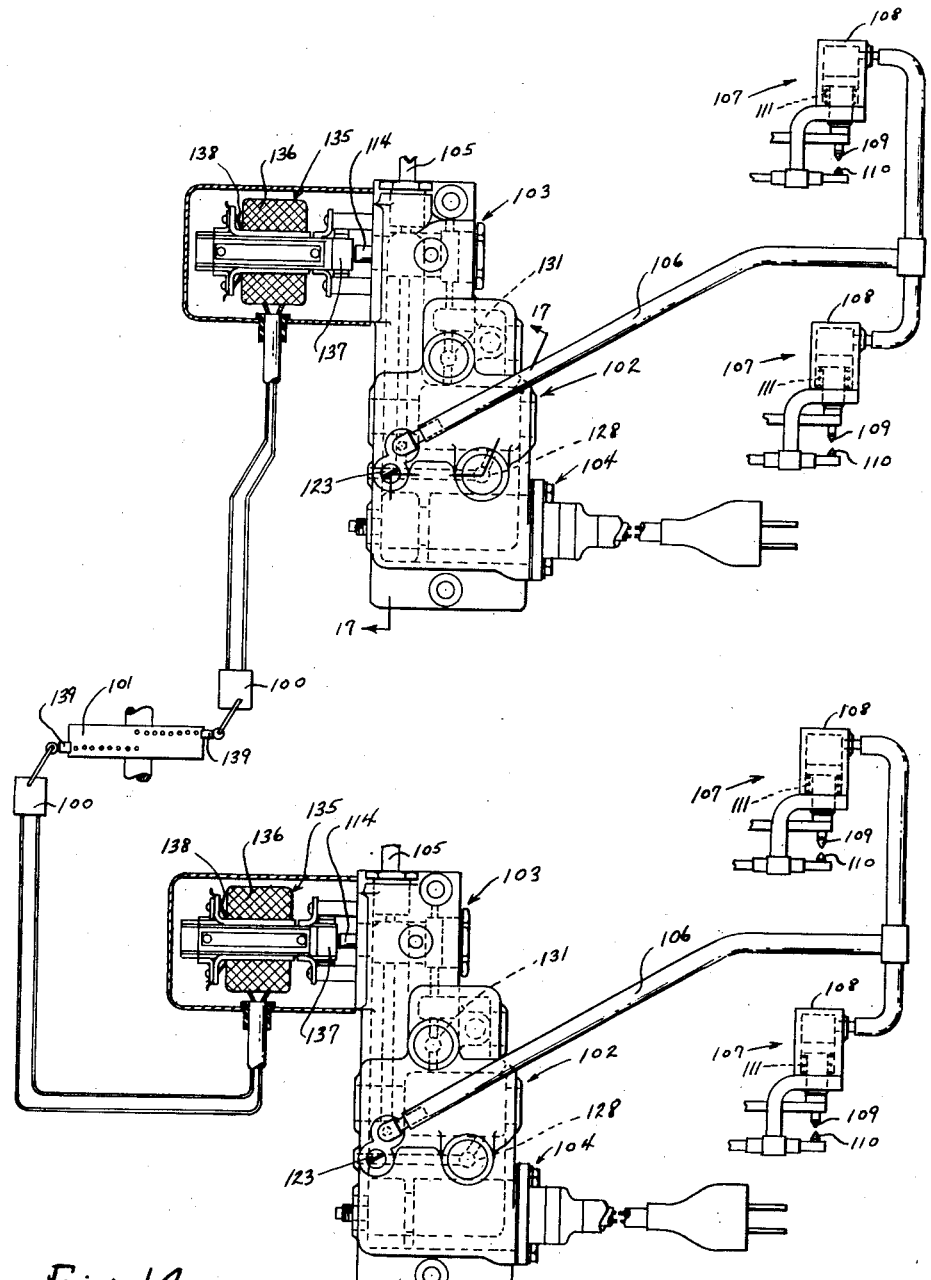
Figure 15:
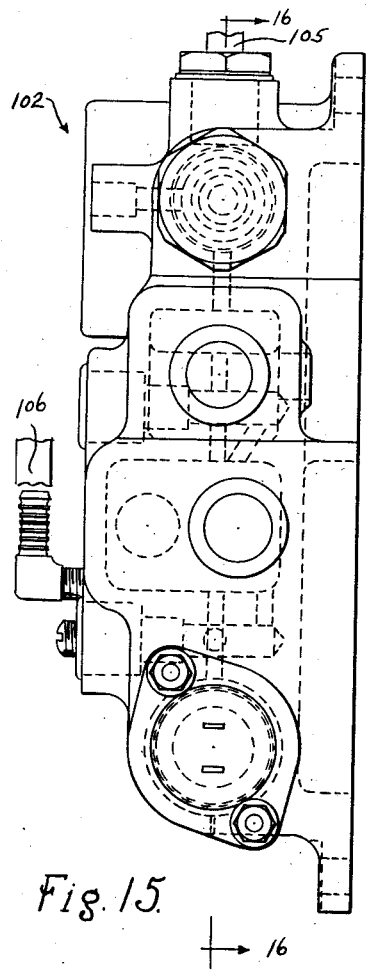
Figure 16:
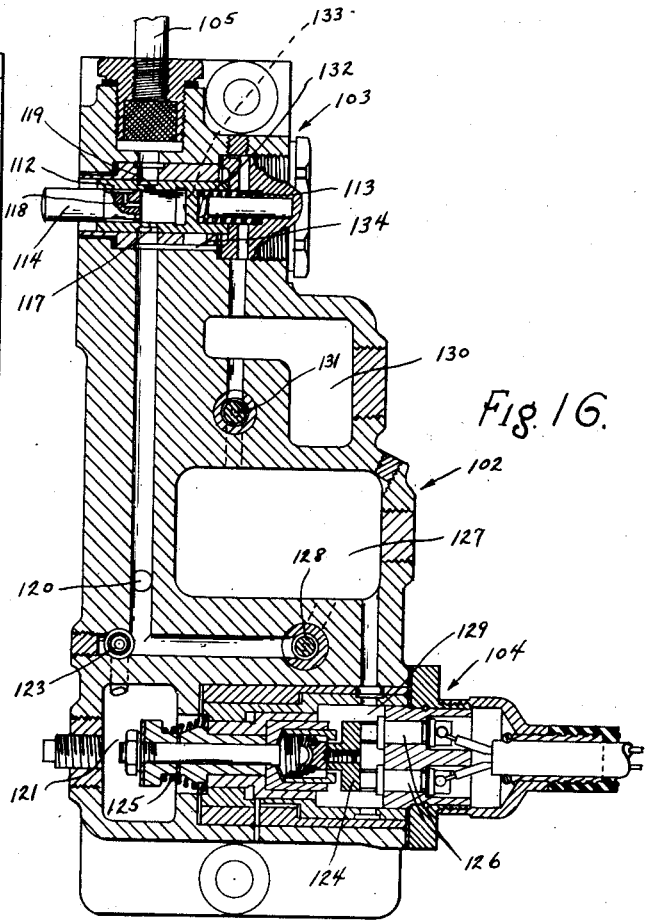
Figure 17:
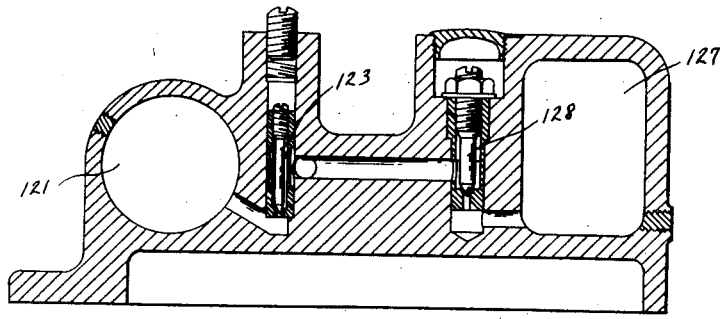

Figures 7, 8, 9, 10, and 11 are sectional views taken respectively on the planes indicated by the lines 7—7, 8—8, 9—9, 10—10, and 11—11 of Figure 6;

Figure 12 is a diagram illustrating the manner in which the welding circuit is controlled by one of the switches;

Figure 13 is an enlarged fragmentary plan view illustrating another embodiment of the present invention;

Figure 14 is a semi-diagrammatic elevational view illustrating a slightly modified form of construction;

Figure 15 is a side elevational view of the control unit shown in Figure 14;

Figure 16 is a sectional view taken substantially on the plane indicated by the line 16—16 of Figure 15; and Figure 17 is a sectional view taken substantially on the plane indicated by the line 17—17 of Figure 14.

The specific embodiment of the invention selected herein for the purpose of illustration shows equipment for automatically controlling the operation of a plurality of groups of welders, although it will be understood as this description proceeds that the principles involved may be used in controlling the operation of a single welder, or of a plurality of individual welders, depending upon the particular requirements. The specific illustration features welding control equipment wherein a plurality of groups of welders are automatically operated in succession and wherein the electrodes of the welders in each group are simultaneously relatively moved into and out of engagement with the work. In addition, the control mechanism featured herein illustrates the manner in which the welding time of any selected welder, or group of welders may be varied with respect to the welding time of additional welders in the same system. This arrangement is of particular importance in cases where metal strips having portions of different thicknesses are welded together since it permits accurately adjusting the welder, or group of welders acting on the portions of different thicknesses of the metal so that the duration of the welds will vary in dependence upon the particular thickness of the metal being welded. As a result, the various portions of the strips of metal of different thicknesses are effectively integrally united together without burning, or otherwise breaking down the structure of the metal.

Figure 1:
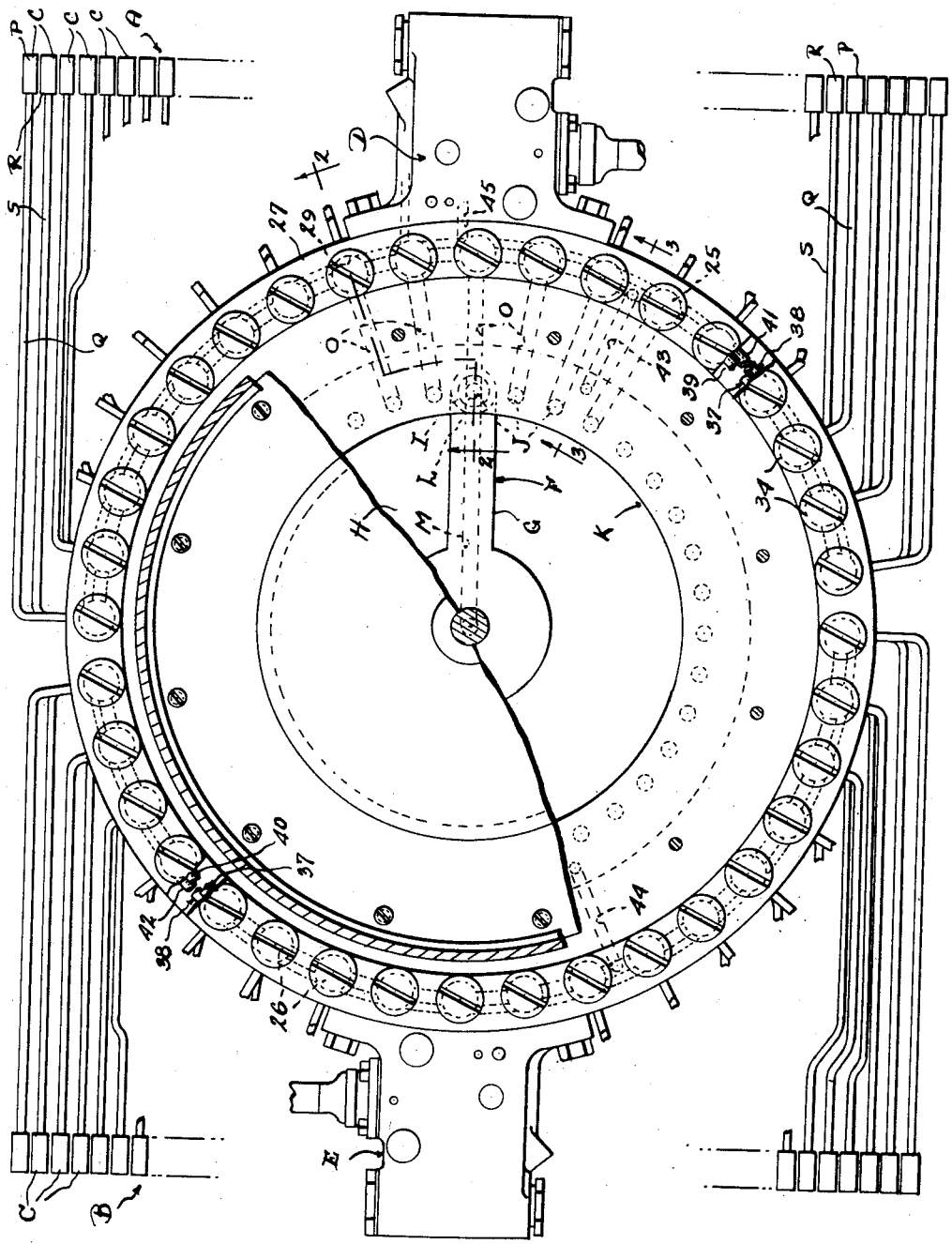
Figure 1 is a plan view of welding equipment constructed in accordance with this invention.
Figure 9:
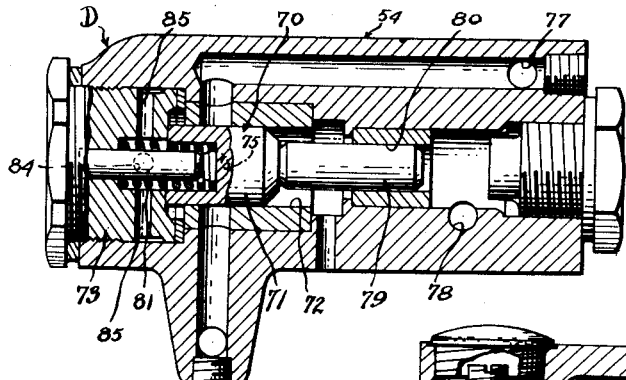
Figure 11:
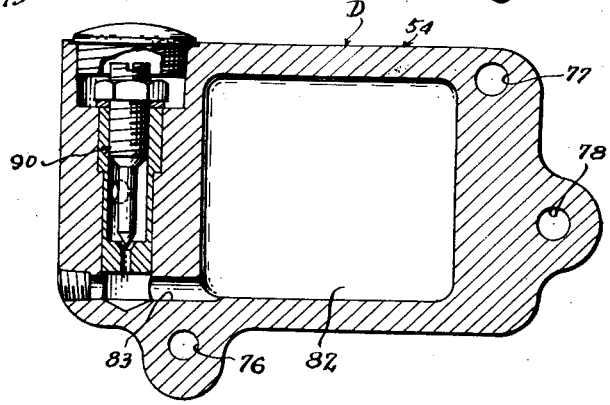
Figure 10:
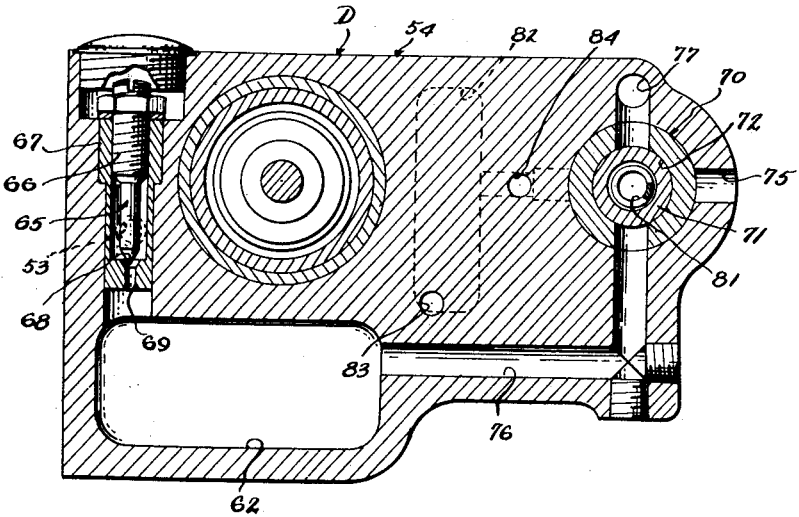

In general, I have shown in Figure 1 welding equipment comprising two banks of welders A and B. Each bank comprises a plurality of welding units and, for the purpose of illustration, each unit is composed of a group of welders C. The welding time of each of the welders in the bank A is controlled by a single fluid pressure actuated switch D, while the welding time of each of the welders in the bank B is independently controlled by the fluid pressure actuated switch E. The two switches are preferably identical in construction but may be adjusted so that the welding time of the welders in the bank A may either be the same or different from the welding time of the welders in the bank B. In cases where the welders in both banks operate on stock having the same characteristics and thickness, both switches will operate in unison so that the welding time of all of the welders in both banks is the same. However, if the welders in the bank B are adapted to operate on stock having a thickness less than the stock upon which the welders in the bank A operate, the switch E is adjusted so that the welders in the bank B have a shorter welding time than the welders in the bank A. Of course, it will be understood that additional switches may be provided in each bank of welders to independently control the welding time of different groups of welders in the same bank, and the manner in which this may be accomplished will be more fully hereinafter described in connection with Figure 13 of the drawings.

As stated above, each bank of welders comprises a plurality of groups of welders C and, in the present instance, the electrodes of the groups of the welders C are successively relatively moved into and out of engagement with the work by a distributing valve F. Upon reference to Figure 4, it will be noted that the distributing valve F comprises an arm G rotatable about a vertical axis in a fluid reservoir H and having a nozzle I at the outer end thereof successively registrable with circumferentially spaced ports J formed in the underside of a plate K. The discharge orifice L in the nozzle I communicates with the upper end of a fluid passage M formed in the arm and having the lower end communicating with the discharge side of a fluid pressure pump N suitably supported in the fluid reservoir H.

The arm G is rotated in any suitable manner for successively registering the nozzle with the ports J in the plate K and fluid pressure is supplied to the ports J through the nozzle by the pump N. Each of the ports J in the plate K communicates with the inner end of a radially outwardly extending passage O having the outer end communicating with the welders in one group C. As shown in Figure 2, the outer end of each passage O communicates with the pressure cylinder of one welder P of the group C by means of a flexible conduit Q and communicates with the pressure cylinder of the other welder R in said group by the flexible conduit S.

All of the welders are preferably of identical construction and upon reference to Figure 5, it will be noted that each welder has a fixed electrode 20 and a movable electrode 21. The electrode 21 is secured to a piston 22 reciprocably mounted in a pressure cylinder 23 and normally urged in a direction against the action of the fluid pressure supplied by the nozzle I through the passages O by means of a spring 24. The electrodes of the welders in the bank A are, of course, electrically connected in the welding circuit with the switch D and the electrodes of the welders in the bank B are electrically connected in the welding circuit with the switch E. A separate transformer is preferably provided for each bank of welders and, since a conventional electric circuit may be employed in association with each bank of welders, it is not believed necessary to illustrate or describe this circuit in detail.

From the foregoing, it will be noted that the fluid pressure successively supplied to each of the passages O by the nozzle I is discharged from each passage O into the pressure cylinders 23 of the group of welders connected to each passage and, as a result, the pistons 22 are moved against the action of the springs 24 in a direction to effect movement of the electrodes 21 into clamping engagement with the stock to be welded. In other words, the electrodes of the welders in each group are simultaneously relatively moved into engagement with the work as the groups of welders in each bank are successively connected to the nozzle I of the distributing valve F. Referring again to Figure 4, it will be noted that fluid under pressure is continuously supplied to each group of welders until the nozzle I has been moved by the arm M out of registration with the port J for the adjacent passage O. At this time, the port J is opened to the atmosphere in the reservoir H and the pressure on the fluid in the adjacent group of welders immediately drops to such an extent as to permit the electrodes 21 to be moved away from the cooperating electrodes 20. Attention may be called to the fact at this time that in the event it is desired to employ only one welder in connection with each passage O, this may be accomplished by merely plugging one of the discharge openings in the outer end of each passage O.

In order to provide maximum welding efficiency, it is necessary to predeterminedly time the operation of the switches D and E so that the closing of the welding circuit to each welder or group of welders is delayed until the electrodes of the welders have been relatively moved into clamping engagement with the stock and to open the circuit before the electrodes are relatively moved out of engagement with the stock. The duration of the welding time of the welders in the banks, of course, depends upon the time interval between closing and opening of the switches associated with the two banks of welders and this welding time may be varied within the limits determined by the length of time the pressure is maintained in each welder or group of welders. It follows from the above that the switches D and E are operated in timed relation to the relative movement of the electrodes of each group C of welders into and out of engagement with the work. In the present instance, each of the switches is operated by air under pressure and, in general, the flow of air to the switch D is controlled by a plurality of valves 25. The flow of air under pressure to the switch E, on the other hand, is controlled by a similar series of valves 26 which, together with the valves 25, are carried by a ring 27 secured to the top of the plate K at the periphery of the latter. The number of valves 25 corresponds to the number of groups C of welders in the bank A, while the number of valves 26 corresponds to the number of groups of welders in the bank B, and these valves are successively operated by the distributing valve F to open communication between a source of fluid under pressure and the interior of the switches at the same time that the electrodes of the groups of welders are relatively moved into clamping engagement with the work. In other words, the arrangement is such that when the electrodes of one group of welders are relatively moved into engagement with the stock by the fluid pressure supplied through the distributing valve F, the air valve associated with this group of welders is automatically opened to allow the passage of air into the switch controlling the welding circuit to the aforesaid group of welders.

The foregoing will perhaps be more fully understood when considering the specific construction provided to accomplish the above results and this construction is shown best in Figure 2 of the drawings. The section illustrated in Figure 2 was selected to indicate one air valve in each bank of welders and it will be noted that these valves are identical in construction so that a description of the valve 25 in the bank A will be sufficient for all of the other valves in both banks. In detail, each of the air valves comprises a valve member 28 located in a chamber 29 formed in the upper end of the ring 27 and having a valve stem 30 supported in the ring 27 for vertical sliding movement relative to the ring. The valve member 28 has a disc 31 of yieldable material secured to the undersurface thereof by the stem 30 and this material is normally urged against a valve seat 32 by means of a spring 33 located in the chamber 29 above the valve member 28. As shown, the lower end of the spring abuts the valve member 28 and the upper end of the spring abuts a plug 34 having a threaded engagement with the upper end of the recess 29 to close the latter. The valve seat 32 is formed on the upper end of a tube 35 fixed into the ring 27 between a fluid pressure supply line 37 and a distributing line 38.

The fluid pressure supply line 37 is formed of two non-communicating semi-circular sections of tubing 39 and 40 cast into the ring 27. The fluid pressure distributing line 38 is formed of two non-communicating circular sections of tubing 41 and 42 also cast into the ring 27. It will be noted from Figure 1 that the tubes 39 and 41 are associated with the bank of welders A, while the tubes 40 and 42 are associated with the bank of welders B. The tube 39 is supplied with fluid under pressure through the passage 43, shown in Figure 3 as formed in the plate K and ring 27. On the other hand, fluid under pressure is supplied to the tube 40 by means of a similar passage 44 also formed in the plate K and ring 27. The arrangement is such as to provide independent fluid supply and distributing lines for each of the switches D and E.

Referring again to Figure 2, it will be noted that the portion of the fluid supply passage 37 in each of the chambers 29 is slotted to permit air under pressure to pass freely into the chambers 29 above the valve members 28. The fluid distributing line 38, on the other hand, is slotted to communicate with the interior of each of the tubes 35 upon which the valve members 28 seat and, in addition, the distributing line communicates with the interior of the switch D through the medium of a passage 45. It will be remembered that the distributing line 38 is formed of the two non-communicating tubes 41 and 42 and that the tube 41 communicates with the switch D, while the tube 42 communicates with the switch E.

With the above arrangement, it will be noted that as the valve members 28 of the group of valves 25 are successively moved upwardly against the action of the springs 33, communication is established between the fluid pressure supply tube 39 and the fluid pressure distributing tube 41. As a result, as each of the valves 25 is opened, fluid pressure is supplied to the switch D associated with the bank of welders A. On the other hand, when the valve members 28 of each of the series of valves 26 are successively moved upwardly, communication is established between the fluid supply tube 40 and the fluid distributing tube 42. As a consequence, opening of any one of the valves 26 provides for the flow of air under pressure to the switch E associated with the bank of welders B.

Each of the valve members 28 is moved upwardly against the action of the associated spring 33 by means of a follower 49 slidably mounted in a bushing 50 and having a head 51 seated on the upper end of the bushing directly beneath each valve stem 30. The bushings 50 are threaded in the top surface of the plate K in a position so determined that one bushing communicates with each fluid pressure passage O in the plate. As a result, the lower ends of the followers are exposed to the fluid pressure in the passages O and these followers are moved upwardly by the fluid pressure in the latter passages to, in turn, effect an upward movement of the valve members 28. Thus, it will be seen that when the distributing valve F is operated to successively relatively move the electrodes of the welders in the groups C into engagement with the work, the air valves are also successively operated to supply air under pressure to the switch controlling the aforesaid group of welders.

*Fluid pressure operated switches D and E*

Although the admission of air under pressure to the switches D and E is controlled by the distributing valve F in a manner that the air is admitted to one or the other of the switches at the same time the electrodes of one group of welders C are relatively moved into engagement with the work by the distributing valve F, nevertheless, the actual operation of the switches to close and open the electric circuit to the group of welders operated by the distributing valve F is controlled independently of relative movement of the electrodes into engagement with the work. With this arrangement, the duration of the weld may be accurately varied within definite limits even though the time interval that the electrodes of the several groups are maintained into engagement with the work is uniform.

Referring now more in detail to the manner in which the switches D and E operate to control the duration of weld of the several groups C of welders and with special reference to the switch D, it will be noted that this switch is shown in detail in Figures 6 to 12, inclusive. Perhaps the operation of the switch D to control the welders in the bank A will be more readily understood upon reference to the diagram shown in Figure 12. As stated above, when the electrodes of one of the groups of welders C in the bank A are relatively moved into engagement with the work by the distributing valve F, the air valve 25 associated with this group of welders is opened, permitting air under pressure to flow from the supply line 27 or tube 39 to the distributing line 38 or tube 41 which communicates with the switch D through the port 45. With this in mind, it will be noted from Figure 12 that the air under pressure flowing through the port 45 is discharged into a passage 53 in the switch casing 54 and one end of the passage 53 communicates with a chamber 55 through the medium of a restricted port 56. The air under pressure in the chamber 55 acts upon a plunger 57 in the switch casing and when the pressure of this air exceeds the force exerted by the spring 58, the plunger 57 is moved against the action of the spring 58 in a direction toward the stationary contact carrying member 59 to engage the contacts 60 on the plunger 57 with the contacts 61 on the fixed member 59. It will, of course, be understood that the contacts are insulated from one another and that the cooperating contacts of each pair are electrically connected in opposite sides of the welding circuit in a manner to close the primary circuit to the welder or group of welders when the plunger 57 is moved by the air under pressure to effect engagement of the cooperating contacts. It will be remembered that the flow of fluid under pressure into the chamber 55 is restricted by the port 56 and the extent of restriction is so determined that closing of the switch D is delayed until the cooperating electrodes of the welder or group of welders are relatively moved into clamping engagement with the work.

As shown in the diagram in Figure 12, fluid under pressure discharged into the passage 53 from the port 45 is also permitted to flow into an accumulating chamber 62 formed in the switch casing 54. The accumulating chamber 62 communicates with the switch chamber 55 at a point between the fixed contact carrying member 59 and the plunger 57 by means of a passage 64. The air under pressure discharged into the chamber 55 from the accumulating chamber 62 acts upon the switch plunger 57 and assists the spring 58 in moving the plunger in a direction away from the fixed contact carrying member 59 to open the welding circuit. The duration of the weld or the time interval between closing of the switch contacts and opening of the latter depends upon the rate at which the pressure is built up in the accumulating chamber 62. This is accurately controlled by metering the flow of air under pressure into the accumulating chamber 62 through the medium of a metering valve 65 located in the passage 53 and shown in Figure 7 as having a needle valve member 66 threaded in a bushing 67 anchored in the switch casing 54 in a manner to be conveniently adjusted from a point exteriorly of the casing. The tapered end of the needle valve is located adjacent a valve seat 68 formed in the reduced inner end of the bushing and controls a restricted port 69 through which air under pressure is compelled to flow from the passage 53 to the accumulating chamber 62. It follows from the above that adjustment of the metering valve controls the rate at which pressure is built up in the accumulating chamber 62 and since the pressure of the air in the accumulating chamber 62 is relied upon to open the switch D, it also follows that the metering valve 65 controls the duration of the weld. In any case, the metering valve 65 is so adjusted that the switch D will open the welding circuit before the electrodes are relatively moved out of engagement with the work.

Inasmuch as the switch D is employed to control all of the welders in the bank A, the rate of operation of the several groups of welders in this bank depends to some extent upon the rapidity at which the switch D can be operated. Therefore, provision is made herein for quickly exhausting the air under pressure from the accumulating chamber 62 and switch chamber 55 after each operation of the switch.

As will be more fully understood from the following description, the switch D is automatically exhausted after each cycle of operation and provision is made herein for controlling the exhaust so that it takes place immediately after the switch D is opened. Referring again to Figures 6 to 12, inclusive, and with special reference to Figure 12, it will be noted that exhausting of the switch D is effected by an exhaust valve 70 housed in the switch casing 54. The exhaust valve 70 comprises a valve plunger 71 reciprocably mounted in a bore 72 formed through the switch casing, and normally urged into engagement with the inner end of a plug 73 threaded into one end of the bore. When in this position, the valve plunger 71 seals or closes the exhaust opening 75 formed in the switch casing to establish communication between the interior of the bore 72 and the atmosphere. The interior of the bore 72 also communicates, at points spaced circumferentially from the exhaust port 75, with the accumulating chamber 62 and chamber 55. As shown in Figure 12, the accumulating chamber 62 communicates with the interior of the bore through the medium of a passage 76 and the end of the chamber 55 which communicates with the passage 53 also communicates with the interior of the bore 72 through the medium of a passage 77. The discharge ends of the passages 77 and 76 communicate with the interior of the bore 72 in such a manner that when the plunger 71 is in its normal position shown in Figure 12, these passages, as well as the exhaust port 75, are closed by the valve plunger.

It follows from the above that the valve plunger 71 must be moved in a direction away from the plug 73 in order to establish communication between the exhaust port 75 and passages 76 and 77. Movement of the exhaust valve plunger 71 in the above mentioned direction is resisted by means of the air pressure from the distributing line 38 or tube 41 communicating with the bore 72 through the medium of a passage 78. The air under pressure supplied to the bore 72 acts upon one end of a pin 79 slidably mounted axially of the bore in a bushing 80 and having the opposite end abutting the valve plunger 71. The pressure of the air discharged into the bore 72 through the passage 78 is greater than the force of the spring 81 acting upon the valve plunger 71 tending to move the same against the action of the air under pressure.

Thus, from the foregoing, it will be seen that the air from the distributing line 38 maintains the exhaust valve closed against the action of the spring 81 until the force exerted by the latter is supplemented with an additional force sufficient to overcome the pressure of the air on the pin 79. Referring again to Figure 12, it will be noted that this additional force is supplied by air pressure built up in a second accumulating chamber 82 in the switch casing communicating with the chamber 55 by means of the passage 83 and communicating with the bore 72 by means of a passage 84. The passage 84 communicates with the bore 72 at a point beyond the end of the plunger acted upon by the spring 81 and, in the present instance, the plug 73 is formed with a series of passages 85 therethrough to provide for the flow of the air against the side of the exhaust valve plunger 71 acted upon by the spring 81. As a result of the above, the air pressure supplied to the bore 72 from the accumulating chamber 82 supplements the action of the spring 81 to move the valve plunger 71 against the action of the fluid pressure acting on the pin 79 and to open communication between the exhaust port 75 and the passages 77 and 76. It may be pointed out at this time that the diameter of the pin 79 is substantially less than the diameter of the valve plunger 71, and as a result of this construction, the area exposed to the air pressure entering the bore from the passage 78, tending to hold the valve plunger in a position wherein the exhaust port is closed, is less than the area of the valve plunger exposed to the action of the fluid under pressure admitted to the bore 72 from the accumulating chamber 82.

As soon as the valve plunger 71 is moved away from the plug 73 by the combined effort of the spring 81 and the air under pressure supplied by the accumulating chamber, the exhaust port 75 is connected to the passages 76 and 77 with the result that the switch is immediately exhausted to the atmosphere. The time interval of operation of the exhaust valve to exhaust the switch depends upon the rate at which pressure builds up in the accumulating chamber 82 and this rate is controlled by a metering valve 90 similar to the metering valve 65 and located in the passage 83 between the switch chamber 55 and the accumulating chamber 82. The metering valve 90 is, of course, accurately adjusted to delay operation of the exhaust valve 70 until the welding circuit has been opened by movement of the switch plunger 57 in a direction away from the fixed contact carrying member 59.

The above arrangement is such that during the interval the electrodes of each group C of welders in the bank A are maintained into engagement with the work, the switch D automatically closes and opens, and that before the electrodes of the next adjacent group C of welders in the bank A are relatively moved into engagement with the work, the switch D is exhausted so as to be ready for another cycle of operation. The switch E for controlling the various groups of welders in the bank B is identical in construction to the switch D and operates in the same manner to effect the desired control of the welding circuit. Of course, it will be understood that the two switches operate entirely independent of one another to control the two banks of welders so that one bank may have a welding time different from the other.

With the construction previously described, the duration of the weld effected by all of the welders in the bank A is the same since the welding circuit is controlled by the single switch D and this is also true of the welders in the bank B. In some cases, it may be desirable to operate certain of the groups of welders in one bank with a different welding time than other welders in the same bank. When such a case arises, the number of switches must be increased and independently adjusted to control their respective welders in the manner required. Figure 13 shows the simplicity with which additional switches may be incorporated in either or both banks of welders. In the specific embodiment selected for the purpose of illustrating the above, one switch D' is provided for seven groups of welders, and this switch is adjusted to provide a welding time different from the remaining welders. This switch D' is identical to the construction of either the switches D or E and is secured to the periphery of the ring 27 in the same manner as either of the foregoing switches. The only modification necessary is to plug the air distributing line 38 beyond the opposite ends of the group of air valves associated with the number of groups of welders it is desired to control by the switch so that the only time that the switch D' operates is when the electrodes of the welders in this group are actuated by the distributing valve F. Plugging of the supply line 38 may be readily accomplished by merely drilling the ring 27 at the points desired and to such an extent that the drilled holes intersect the distributing line. The drilled holes may then be tapped and a plug 91 secured therein to seal this portion of the supply line from the remaining portion thereof. By following this procedure, the two banks of welders A and B may be divided into any number of sections and the welders in these sections may be operated to provide different intervals of weld.

*Operation*

Rotation of the arm M about the axis of the reservoir H successively registers the nozzle I with the inner ends of the radially extending passages O and supplies a hydraulic fluid medium under pressure to the welders communicating with the outer ends of the passages O. Briefly, the fluid under pressure discharged from the outer ends of each passage O acts upon the pistons 22 of the welders connected to the particular passage and moves the electrodes 21 toward the cooperating electrodes 20 to clamp the stock therebetween. The number of welders connected to each passage O may, of course, vary in dependence upon the particular requirements and in the interests of simplicity are referred to herein as constituting one group of welders.

At the same time that the hydraulic fluid medium is discharged from the outer end of each of the passages O to the particular group of welders connected to this passage, the pressure of the medium acts upon the lower end of the valve plunger 49 to move the same toward the associated air valve member 28. As shown in Figure 2, movement of the plunger 49 toward the valve member 28 lifts the latter from its seat 32 and opens communication between the air pressure supply line 37 and the air pressure distributing line 38. The air flows through the distributing line 38 to one or the other of the switches D and E depending upon the particular bank in which the distributing valve F is operating. It will be assumed for the purpose of explanation that the distributing valve is operating in the bank A and this being the case, the air under pressure from the supply line 38 is discharged into switch D through the discharge port 45 in the ring 27. Upon reference to Figure 12, it will be noted that the air under pressure flowing through the discharge port 45 is discharged into the switch chamber 55 in a manner to move the switch plunger 57 in a direction toward the stationary contact carrying member 59. This movement is accomplished against the action of the spring 58 and causes the movable contacts 60 to engage the stationary contacts 61. As soon as this is accomplished, the welding circuit to the group of electric welders registering with the distributing valve F is closed and, in order to delay closing of this circuit until the electrodes of the group of welders are relatively moved into clamping engagement with the stock, the rate of pressure rise in the switch chamber 55 is restricted by the port 56.

The fluid under pressure from the discharge port 45 also flows into the accumulating chamber 62 through the metering valve 65 and from the accumulating chamber into the switch chamber 55 between the switch plunger 57 and stationary contact carrying member 59. When the force exerted on the switch plunger 57 by the spring 58 plus the air pressure discharged into the switch chamber 55 from the accumulating chamber 62 exceeds the pressure in the switch chamber 55 on the opposite end of the plunger 57, the latter is moved in a direction away from the contact carrying member 59 to open the welding circuit. The metering valve 65 is, of course, adjusted to delay the pressure rise in the accumulating chamber 62 until the desired welding time has expired and, as a consequence, adjustment of the metering valve 65 offers the possibility of varying the duration of the weld. In any event, however, the adjustment of the metering valve 65 is such as to provide for opening the welding circuit before the electrodes of the group of welders are relatively moved out of engagement with the work.

After the welding circuit has been opened to the particular group of welders referred to above, the distributing valve F ultimately moves out of registration with the passage O communicating with the latter group of welders and moves into registration with the next adjacent passage O. As a result, the passage O just served by the distributing valve is open to the interior of the reservoir H and the pressure in this passage drops to such an extent as to permit the springs 24 to move the pistons 22 in the group of welders communicating with this passage in a direction away from the fixed electrodes 20 to release the clamping engagement of the electrodes on the work. The above operation is repeated each time the distributing valve F serves one of the passages O, with the exception, of course, that when the valve F is working in the bank B, the switch E is operated instead of the switch D.

During the interval of distributing valve moves from one passage O to the next adjacent passage O, the exhaust valve 70 is actuated to effectively exhaust the switch chamber 55 and the accumulating chamber 62. In this connection, it will be noted that air pressure from the switch chamber 55 is admitted to the exhaust valve accumulating chamber 82 through the metering valve 90 which is adjusted to delay the rate of pressure rise in the accumulating chamber 82 to such an extent that this pressure will not become sufficient to operate the exhaust valve plunger 71 until the circuit to the welders has been opened by the switch. In this manner, the switch is effectively and quickly exhausted after each operation which is desirable in that it offers the possibility of reducing the time interval between successive operations of the switch to the minimum.

In the embodiment of the invention illustrated in Figures 14 to 17, inclusive, I have shown the manner in which the welding devices may be electrically controlled to effect the welding operation. As will be presently set forth, the modified construction renders it possible to eliminate the distributing valve F and associated parts including the air valves 25 and 26.

Briefly described, a plurality of switches 100 are respectively arranged in a corresponding number of electric circuits and a revoluble contact disc 101 is provided for operating the switches either simultaneously, or in succession depending upon the particular requirements. In either case, each switch operates a control unit 102 having an air valve 103 for controlling the flow of air under pressure to the welding devices and having a switch 104 for controlling the flow of electrical current to the welding devices.

It may also be pointed out at this time that the number of control units depends upon the number of welding devices it is desired to independently control and, of course, may vary in accordance with the particular work to be operated upon. For the purpose of illustration, I have shown the manner in which two banks of welding devices may be independently controlled by two control units 102. However, since both units may be identical in construction, only one will be described in detail herein.

Referring now more in detail to the particular construction illustrated in Figures 14 to 17, inclusive, it will be noted that each control unit 102 is positioned to establish communication between a fluid pressure supply conduit 105 and a delivery conduit 106. The delivery conduit 106 of one control unit is shown in Figure 14 as connected to the welders 107 of one bank and the corresponding delivery conduit of the other control unit is connected to a plurality of similar welders in another bank. The welders provided may be identical in construction to the one shown in Figure 5 of the first embodiment of this invention and the fluid under pressure admitted to the cylinders 108 of the welders from the distributing line 106 serves to move the electrodes 109 toward the fixed electrodes 110 against the action of the spring 111. The spring 111 is of sufficient strength to move the electrodes 109 away from the cooperating fixed electrodes 110 when the fluid pressure in the cylinder 108 is exhausted.

The flow of fluid pressure from the supply line 105 to the distributing line 106 is controlled by the valve 103 having a reciprocable sleeve 112 normally urged by a spring 113 to a position wherein the supply line 105 is closed thereby and adapted to be moved against the action of the spring 113 to the position shown in Figure 16 by a plunger 114 reciprocably mounted in the sleeve. When the sleeve 112 is moved by the plunger 114 to its innermost position, an annular groove 117 in the sleeve registers with the supply line to establish communication therethrough and a passage 118 in the plunger 114 communicates with a restricted port 119 through the sleeve. The arrangement is such that fluid pressure entering the passage 118 through the restricted port 119 builds up behind the plunger 114 and returns the latter to its initial position shown in Figure 16. The sleeve, however, is maintained in the position shown in Figure 16 since the pressure exerted on the sleeve by the spring 113 is less than the fluid pressure through the supply line. The fluid pressure admitted by the valve 103 is discharged through an outlet port 120 to the distributing line 106 and from the latter to the cylinders of the welding units.

The switch 104 is identical in construction and operation to the switch D shown in Figure 8 of the drawings. This switch is arranged in the welding circuit to the electrodes of the particular bank of welders controlled by the unit 102 and is closed in timed relation to relative movement of the electrodes into engagement with the work to be welded. In this connection, it will be noted that fluid pressure from the valve 103 is admitted to a chamber 121 through a metering valve 123. The chamber 121 is so arranged that pressure built up in this chamber exerts a force on the movable contact carrying member 124 to move the latter against the action of the spring 125 into engagement with the fixed contacts 126. The metering valve 123 is, of course, adjusted to control the pressure rise in the chamber 121 so that the closing of the circuit to the electrodes will be delayed until the electrodes have been relatively moved into engagement with the work.

Upon reference to Figure 16, it will be noted that fluid pressure is also permitted to flow into an accumulating chamber 127 through a metering valve 128 and this accumulating chamber communicates with a switch opening chamber 129 so arranged that the pressure built up in this chamber acts upon the contact carrying member 124 to assist the spring 125 in opening the switch 104. The rate of pressure rise in the accumulating chamber 127 is controlled by the metering valve 128 and the adjustment of the latter is predetermined to delay opening of the switch until the proper duration of weld has taken place. It will, of course, be understood as this description proceeds that the switch is opened before the electrodes are relatively moved out of engagement with the work and, in order to insure this operation, the following construction is provided.

The accumulating chamber 127 also communicates with an auxiliary chamber 130 through the medium of a metering valve 131 and the chamber 130 communicates with a chamber 132 located in a position such that the pressure of the fluid built up therein acts on the sleeve 112 to assist the action of the spring 113 in moving the sleeve to a position wherein the supply line is closed. Movement of the sleeve 112 to its closed position permits the fluid under pressure in the welder cylinders to exhaust back through the supply line to the outlet port 133 shown in Figure 16 as communicating with the supply line through a transfer passage 134. As pointed out above, exhausting of the fluid pressure from the cylinders of the welder allows the springs 111 to relatively move the electrodes out of engagement with the work.

It will be remembered from the above that the switch 104 is automatically opened before the electrodes are relatively moved out of engagement with the work and this is accomplished by carefully adjusting the needle valve 131 to prevent a pressure rise in the chamber 130 sufficient to close the valve 133 until the switch 104 is opened.

In the foregoing description, reference has been made to the fact that the valves 103 of the control units 102 are automatically opened by the switches 100. This is accomplished, in the present instance, by equipping each control unit with a solenoid 135 having a coil 136 connected in a circuit with one of the switches 100 and having an armature 137 positioned in alignment with the plunger 118 for engagement with the outer end of the latter. The arrangement is such that when one of the switches 100 is closed, the coil 136 is energized and the armature 137 is moved against the action of the spring 138 in a direction to operate the plunger 118 to open the valve 103. The switches 100 are operated by suitable trips 139 secured to a revoluble contact disc 101. The trips 139 are adjustable on the disc 101 relative to each other so as to provide for varying the time interval between operation of the two banks of welders.

What I claim as my invention is:

1. In electric welding equipment, a welder having electrodes arranged in an electric circuit, means for relatively moving the electrodes into and out of engagement with the work to be welded, means controlling the operation of the electrode moving means, a switch in said circuit for controlling the latter, fluid pressure operated means for actuating the switch to close the circuit to the electrodes in timed relation to relative movement of the electrodes into engagement with the work and for opening the circuit to the electrodes in timed relation to closing of the switch, means other than said control means for exhausting said switch including a valve movable to both its open and closed positions by fluid under pressure, and means for regulating the pressure acting on the valve to open the same.

2. In electric welding equipment, a welder having electrodes arranged in an electric circuit, means for relatively moving the electrodes into and out of engagement with the means controlling the operation of the electrode moving means work to be welded, a switch in said circuit for controlling the latter, fluid pressure operated means for actuating the switch to close the circuit to the electrodes in timed relation to relative movement of the electrodes into engagement with the work and for opening the circuit to the electrodes in timed relation to closing of the switch, means for regulating the flow of fluid pressure to control the time interval between closing of the circuit and opening of the latter, means other than the first named control means for exhausting the switch subsequent to operation of the latter to open the circuit, and means for regulating the time interval between opening of the circuit and operation of the last named means to exhaust the switch.

3. In an electric welding equipment, a welder having electrodes arranged in an electric circuit, means for relatively moving the electrodes into and out of engagement with the work to be welded, means controlling the operation of the electrode moving means a switch in said circuit for controlling the latter, fluid pressure operated means for actuating the switch to close the circuit to the electrodes in timed relation to relative movement of the electrodes into engagement with the work and for opening the circuit to the electrodes in timed relation to closing of the switch, means other than the control means and operable by fluid under pressure to exhaust fluid pressure from the switch after opening of the circuit by the switch, and means for regulating the pressure acting on said exhaust means to vary the time interval between opening of the circuit and operation of the exhaust means to exhaust the switch.

4. In electric welding equipment, a welder having electrodes arranged in an electric circuit, means for relatively moving the electrodes into and out of engagement with the work to be welded, means for controlling the operation of the electrode moving means, a switch in said circuit for controlling the latter, fluid pressure operated means for actuating the switch to close the circuit to the electrodes in timed relation to relative movement of the electrodes into engagement with the work and for opening the circuit to the electrodes in timed relation to closing of the switch, means other than the control means for exhausting fluid pressure from the switch including a valve, and means for regulating the pressure acting on said valve to vary the interval of operation of the latter to exhaust the switch with respect to the interval said switch is opened.

5. In electric welding equipment, a welder having electrodes arranged in an electric circuit, means for relatively moving in the electrodes into and out of engagement with the work to be welded means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter by the switch, and means other than the control means for exhausting the switch including a plunger type valve having opposite ends of differential areas acted upon by the fluid under pressure from the supply line, the end of greatest area being acted upon by the fluid under pressure tending to open the valve, and means for metering the pressure acting on the end of the valve of greatest area.

6. In electric welding equipment, a welder having electrodes arranged in an electric circuit, means for relatively moving the electrodes into and out of engagement with the work to be welded, means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter by the switch, means for regulating the flow of fluid pressure to control the time interval between closing and opening of the circuit, means other than said first named control means also operated by fluid pressure from the supply line to exhaust fluid pressure from the switch, and means for metering the flow of fluid pressure to the last named means to control the time interval between opening of the circuit and exhausting of the switch.

7. In electric welding equipment, a welder having electrodes arranged in an electric circuit, means for relatively moving the electrodes into and out of engagement with the work to be welded, means for controlling the operation of the electrode moving means, a switch in said circuit for controlling the latter, fluid pressure operated means for actuating the switch to close the circuit to the electrodes in timed relation to relative movement of the electrodes into engagement with the work and for opening the circuit to the electrodes in timed relation to closing of the switch, means other than said control means for exhausting the switch including a valve normally urged by fluid pressure to a position wherein the exhaust is closed, and movable to its open position by fluid pressure in timed relation to opening of the circuit by said switch.

8. In electric welding equipment, a welder having electrodes arranged in an electric circuit, means for relatively moving the electrodes into and out of engagement with the work to be welded, means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter by the switch, an exhaust for the switch permitting the escape of fluid under pressure from the switch, a valve controlling the exhaust and normally urged by fluid pressure from the supply line to a position wherein the exhaust is closed, means for opening the valve against the action of the fluid pressure aforesaid to exhaust the fluid pressure from the switch, and means for regulating the operation of the last named means to effect exhausting of the switch immediately after opening of the circuit by the switch.

9. In electric welding equipment, a welder having electrodes arranged in an electric circuit, means for relatively moving the electrodes into and out of engagement with the work to be welded, means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter by the switch, an exhaust for the switch permitting the escape of fluid under pressure from the switch, means other than the control means for controlling the exhaust including a valve, means actuated by fluid under pressure from the supply line and acting on one side of the valve to normally maintain the latter in a position wherein the exhaust is closed, means responsive to fluid pressure from the supply line and acting on the opposite side of the valve to open said exhaust, and means metering the flow of fluid pressure to the latter side of the valve to provide for exhausting the switch immediately after the circuit to the electrodes is opened by the switch.

10. In electric welding equipment, a welder having electrodes arranged in an electric circuit, means for relatively moving the electrodes into and out of engagement with the work to be welded, means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter by the switch, means for regulating the flow of fluid pressure to control the time interval between closing and opening of the circuit, and means other than the first named control means for exhausting the switch including a valve movable to its open position by fluid pressure from the regulating means aforesaid.

11. In electric welding equipment, a welder having electrodes arranged in an electric circuit, means for relatively moving the electrodes into and out of engagement with the work to be welded, means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter, means for regulating the flow of fluid pressure to control the time interval between closing and opening of the circuit, means other than the first named control means for exhausting the switch including a valve movable to its open position by fluid pressure from the regulating means aforesaid, and adjustable means for controlling the rate of flow of fluid pressure from the regulating means to the valve whereby the operation of the latter may be accurately timed with respect to operation of the switch to open the circuit.

12. In electric welding equipment, a welder having electrodes arranged in an electric circuit, means for relatively moving the electrodes into and out of engagement with the work to be welded, means for controlling the operation of the electrode moving means, a switch in said circuit for controlling the latter, a fluid pressure supply line, means operated by fluid pressure from the supply line to actuate the switch to close the circuit to the electrodes in timed relation to relative movement of the latter into engagement with the work and to open the circuit in timed relation to closing of the latter by the switch, means other than said control means for exhausting fluid pressure from the switch including a valve movable to its open position by fluid under pressure from the supply line, an accumulating chamber communicating with the fluid pressure supply line and communicating with the valve to open the same, and means for regulating the rate at which fluid pressure builds up in the accumulating chamber to effect opening of the exhaust valve in timed relation to operation of the switch to open the circuit.

13. In electric welding equipment, a welder having electrodes arranged in an electric circuit, means for relatively moving the electrodes into and out of engagement with the work to be welded, means for controlling the operation of the electrode moving means, means for controlling the circuit in timed relation to relative movement of the electrodes including a switch having a contact carrying member movable in one direction to close the circuit and movable in another direction to open the circuit, means for introducing fluid pressure into the switch at opposite sides of the member to move the latter in both of said directions, means controlling the rate of flow of fluid pressure to one side of the contact carrying member to effect closing of the switch in timed relation to relative movement of the electrodes into engagement with the work, adjustable means for independently controlling the rate of flow of fluid pressure to the opposite side of the member to effect opening of the circuit in timed relation to the closing of the same, means other than the first named control means for exhausting the switch including a valve movable to its open position by fluid pressure under the control of the adjustable means, and means for metering the flow of fluid pressure from the adjustable means to the valve.

14. In electric welding equipment, a welder having electrodes arranged in an electric circuit, means for relatively moving the electrodes into and out of engagement with the work to be welded, means for controlling the operation of the electrode moving means, means for controlling the circuit in timed relation to relative movement of the electrodes including a switch having a contact carrying member movable in one direction to close the circuit and movable in another direction to open the circuit, means for introducing fluid pressure into the switch at opposite sides of the member to move the latter in both of said directions, means controlling the rate of flow of fluid pressure to one side of the contact carrying member to effect closing of the switch in timed relation to relative movement of the electrodes into engagement with the work, adjustable means for independently controlling the rate of flow of fluid pressure to the opposite side of the member to effect opening of the circuit in timed relation to the closing of the same, means other than the first named control means for exhausting the switch including a valve movable to its open position by fluid under pressure, a pressure accumulating chamber receiving fluid pressure under control of the said adjustable means and communicating with the valve to open the latter when the pressure exceeds a predetermined value, and means for regulating the rate at which pressure builds up in the accumulating chamber to provide for opening of the exhaust valve in timed relation to operation of the switch to open the circuit to the electrodes.

15. In electric welding equipment, a welder having relatively movable electrodes arranged in an electric circuit, a fluid pressure supply line communicating with the welder, means for introducing fluid under pressure from the supply line into the welder, means responsive to the fluid under pressure admitted to the welder to relatively move the electrodes into engagement with the work, a fluid pressure operated valve communicating with the supply line in advance of the welder to receive fluid pressure prior to admitting the same to the welder and operated by the pressure of the fluid, and a switch in said circuit responsive to the operation of the valve to close the circuit to said electrodes.

16. In electric welding equipment, a welder having relatively movable electrodes arranged in an electric circuit, a fluid pressure supply line, means for introducing fluid under pressure from the supply line into the welder, means responsive to the fluid under pressure to relatively move the electrodes into engagement with the work, a fluid pressure operated switch in the circuit, a fluid pressure operated valve controlling the flow of fluid under pressure to the switch, said valve communicating with the fluid supply line in advance of the welder and movable to its open position by the pressure of the fluid flowing from the supply line to the welder to operate the switch to close the circuit to the electrodes, and means retarding the flow of fluid pressure to the switch to delay closing of the circuit until the electrodes are relatively moved into engagement with the work.

17. In electric welding equipment, a welder having relatively movable electrodes arranged in an electric circuit, a fluid pressure supply line, means for introducing fluid under pressure from the supply line into the welder, means responsive to the fluid under pressure to relatively move the electrodes into engagement with the work, a second fluid pressure supply line independent of the first mentioned fluid supply line, a switch in the circuit to the electrodes operated by the fluid pressure in said second supply line to close the circuit, and means actuated by the fluid under pressure flowing through the first named supply line prior to admitting the latter fluid pressure to the welder to open communication between the second supply line and switch for operating the latter to close said circuit.

18. In electric welding equipment, a welder having relatively movable electrodes arranged in an electric circuit, a fluid pressure supply line, means for introducing fluid under pressure from the supply line into the welder, means responsive to the fluid under pressure to relatively move the electrodes into engagement with the work, air pressure supply and distributing lines normally out of communication with each other, a switch communicating with the distributing line and located in the circuit to the electrodes to control said circuit, and a valve controlling communication between said air pressure lines and movable to open position by the fluid pressure flowing through the first named supply line prior to admitting the latter fluid pressure to the welder to effect an operation of the switch to close the circuit to the electrodes.

19. In electric welding equipment, a welder having relatively movable electrodes arranged in an electric circuit, a fluid pressure supply line, means for introducing fluid under pressure from the supply line into the welder, means responsive to the fluid under pressure to relatively move the electrodes into engagement with the work, a second fluid pressure supply line, a switch in the circuit to the electrodes operated by the fluid pressure in said supply line to close the circuit, means communicating with the first supply line in advance of the welder and responsive to the fluid under pressure flowing to the welder to open communication between the second supply line and switch for operating the latter to close said circuit, and means responsive to the fluid pressure supplied to the switch from the second supply line to open the switch in timed relation to closing the same.

20. In electric welding equipment, a welder having relatively movable electrodes arranged in an electric circuit, means for introducing fluid under pressure into the welder, means responsive to the fluid under pressure to relatively move the electrodes into engagement with the work, fluid pressure supply and distributing lines normally out of communication with each other, a switch communicating with the distributing line and located in the circuit to the electrodes to control said circuit, a valve controlling communication between said lines and movable to open position by the fluid pressure supplied to the welder to effect an operation of the switch to close the circuit to the electrodes, means responsive to the fluid pressure supplied to the switch from the distributing line to open the switch in timed relation to closing of the circuit, a second valve operated by the fluid pressure supplied to the switch for exhausting the fluid pressure from the switch subsequent to opening of the circuit by said switch, and means for regulating the flow of fluid pressure to said second valve to control the interval of operation of the latter to exhaust said switch.

21. In electric welding equipment, a plurality of welders each having relatively movable electrodes arranged in an electric circuit, means for successively introducing fluid under pressure into the welders, means associated with each welder and responsive to the fluid pressure admitted thereto to relatively move the electrodes into engagement with the work, a fluid pressure supply line, a switch in the circuit to the electrodes and operated by fluid pressure from the supply line to control the circuit in timed relation to relative movement of the electrodes into and out of engagement with the work, a plurality of valves independently controlling communication between the supply line and switch and successively movable to open positions by the fluid pressure admitted to the welders to independently effect an operation of the switch to close the circuit each time the electrodes of one welder are relatively moved into engagement with the work, and means for opening the switch after a predetermined interval of time elapses.

22. In electric welding equipment, a plurality of welders each having relatively movable electrodes arranged in an electric circuit, means for successively introducing fluid under pressure into the welders, means associated with each welder and responsive to the fluid pressure admitted thereto to relatively move the electrodes into engagement with the work, a fluid pressure supply line, a switch in the circuit to the electrodes and operated by fluid pressure from the supply line to control the circuit in timed relation to relative movement of the electrodes into and out of engagement with the work, a plurality of valves independently controlling communication between the supply line and switch and successively movable to open positions by the fluid pressure admitted to the welders to independently effect an operation of the switch to close the circuit each time the electrodes of one welder are relatively moved into engagement with the work, means responsive to the fluid pressure supplied to the switch from the supply line to open the switch in timed relation to closing of the same, and means for regulating the operation of the last named means to control the time interval between closing and opening of the circuit by the switch.

23. In electric welding equipment, a plurality of welders each having relatively movable electrodes arranged in an electric circuit, means for successively introducing fluid under pressure into the welders, means associated with each welder and responsive to the fluid pressure admitted thereto to relatively move the electrodes into engagement with the work, a fluid pressure supply line, a switch in the circuit to the electrodes and operated by fluid pressure from the supply line to control the circuit in timed relation to relative movement of the electrodes into and out of engagement with the work, a plurality of valves independently controlling communication between the supply line and switch and successively movable to open positions by the fluid pressure admitted to the welders to independently effect an operation of the switch to close the circuit each time the electrodes of one welder are relatively moved into engagement with the work, means responsive to the fluid pressure supplied to the switch from the supply line to open the switch in timed relation to closing of the same, and means for exhausting the switch during the intervals between successive operation of the welders.

24. In electric welding equipment, a plurality of welders each having relatively movable electrodes arranged in an electric circuit, means for successively introducing fluid under pressure into the welders, means associated with each welder and responsive to the fluid pressure admitted thereto to relatively move the electrodes into engagement with the work, a fluid pressure supply line, a switch in the circuit to the electrodes and operated by fluid pressure from the supply line to control the circuit in timed relation to relative movement of the electrodes into and out of engagement with the work, a plurality of valves independently controlling communication between the supply line and switch and successively movable to open positions by the fluid pressure admitted to the welders to independently effect an operation of the switch to close the circuit each time the electrodes of one welder are relatively moved into engagement with the work, means responsive to the fluid pressure supplied to the switch from the supply line to open the switch in timed relation to closing of the same, means for regulating the operation of the last named means to control the time interval between closing and opening of the circuit by the switch, a valve actuated by the fluid pressure supplied to the switch from the supply line to exhaust the switch during the intervals between successive operation of the welders, and means for regulating the operation of the exhaust valve to control the interval of operation of the latter to exhaust said switch.

25. In electric welding equipment, a plurality of welders each having relatively movable electrodes, an electric circuit for one series of welders, a second electric circuit for another series of welders, means for successively introducing fluid under pressure into the welders of both series, means associated with each welder and responsive to the fluid under pressure admitted thereto to relatively move the electrodes into engagement with the work, a fluid pressure supply line for each series of welders, a switch in each circuit and respectively operated by fluid pressure from the supply lines to independently control the circuits in timed relation to relative movement of the electrodes into and out of engagement with the work, a plurality of valves independently controlling communication between the supply lines and switches and successively movable to open positions by the fluid pressure admitted to the welders in both series to independently effect an operation of the switches to close said circuits, and means responsive to fluid pressure supplied to each switch from the respective supply lines to open the switches in timed relation to closing of the same.

26. In electric welding equipment, a plurality of welders each having relatively movable electrodes, an electric circuit for one series of welders, a second electric circuit for another series of welders, means for successively introducing fluid under pressure into the welders of both series, means associated with each welder and responsive to the fluid under pressure admitted thereto to relatively move the electrodes into engagement with the work, a fluid pressure supply line for each series of welders, a switch in each circuit and respectively operated by fluid pressure from the supply lines to independently control the circuits in timed relation to relative movement of the electrodes into and out of engagement with the work, a plurality of valves associated with one series of welders and arranged to independently control communication between the supply line for the latter series and associated switch and successively movable to open positions by the fluid pressure admitted to the welders in the latter series to independently effect an operation of said switch to close one circuit each time the electrodes of one welder in said series are relatively moved into engagement with the work, another group of valves associated with another series of welders and arranged to independently control communication between the second supply line and second switch and successively movable to open positions by the fluid pressure admitted to the welders in the second series to independently effect an operation of the second switch to close the other circuit each time the electrodes of one welder in the second series are relatively moved into engagement with the work, means responsive to fluid pressure supplied to each switch from the respective supply lines to open the switches, and means for separately regulating the operation of each switch to independently control the time interval between closing and opening of said switches.

27. In electric welding equipment, a plurality of welders each having relatively movable electrodes, an electric circuit for one series of welders, a second electric circuit for another series of welders, means for successively introducing fluid under pressure into the welders of both series, means associated with each welder and responsive to the fluid under pressure admitted thereto to relatively move the electrodes into engagement with the work, a fluid pressure supply line for each series of welders, a switch in each circuit and respectively operated by fluid pressure from the supply lines to independently control the circuits in timed relation to relative movement of the electrodes into and out of engagement with the work, a plurality of valves independently controlling communication between the supply lines and switches and successively movable to open positions by the fluid pressure admitted to the welders in both series to independently effect an operation of the switches to close said circuits, means responsive to fluid pressure supplied to each switch from the respective supply lines to open the switches in timed relation to closing of the same, and a valve controlled exhaust for each switch respectively operated by fluid pressure from the supply lines to exhaust each switch between successive operation of the welders.

28. In electric welding equipment, a plurality of welders each having relatively movable electrodes, fluid pressure lines independently serving the welders to relatively move the electrodes into engagement with the work, a valve in each fluid pressure line for independently controlling the flow of fluid pressure to the welders and for controlling the exhaust of fluid pressure from the welders to permit the electrodes to move out of engagement with the work, an electric circuit for each welder, a fluid pressure operated switch in each circuit controlled by said valves to independently close and open the circuits to the welders in timed relation to relative movement of the electrodes into and out of engagement with the work, and means for operating the valves in timed relation to each other.

29. In electric welding equipment, a plurality of welders each having relatively movable electrodes, fluid pressure lines independently serving the electrodes to relatively move the electrodes into engagement with the work, a control unit associated with each fluid pressure line, a valve associated with each control unit for independently controlling the flow of fluid pressure to the welders and for controlling the exhaust of fluid pressure from the welders to permit relative movement of the electrodes out of engagement with the work, an electric circuit for each welder, a fluid pressure operated switch in each circuit and controlled by the valves to independently close and open the circuits to the welders, means also associated with each control unit for independently regulating the fluid pressure admitted to the switches by the valves to control the operation of the switches with respect to relative movement of the electrodes into and out of engagement with the work, a solenoid for operating each valve and arranged in independent circuits, a switch in each of the solenoid circuits, and means for operating the latter switches in predetermined timed relationship.

30. In electric welding equipment, a plurality of welding devices having electrodes arranged in an electric circuit, a fluid pressure supply line, means for successively introducing fluid pressure from the supply line to the welders for relatively moving the electrodes into engagement with the work to be welded, a switch in said circuit for controlling the latter, a second fluid supply line independent of the first named fluid supply line, means operated by fluid pressure from the second fluid supply line for successively operating the switch to close the circuit to the electrodes in timed relation to relative movement of the electrodes into engagement with the work and to open the circuit prior to relative movement of the electrodes out of engagement with the work, and means operated by fluid pressure from the second named fluid supply line to exhaust the fluid pressure from the switch in timed relation to each operation of the switch to open the circuit to the electrodes.

31. In electric welding equipment, a plurality of welding units having relatively movable electrodes arranged in an electric circuit, means for successively supplying fluid under pressure to the welding units, means responsive to the fluid pressure supplied to the welding units to relatively move the electrodes into engagement with the work, a fluid pressure supply line, a switch in the circuit to the electrodes and operated by fluid pressure from the supply line to control the circuit in timed relation to relative movement of the electrodes into and out of engagement with the work, a valve associated with each of the welding units and effective to control communication between the supply line and switch, said valves being successively movable to their open positions by the fluid pressure admitted to the welding units so that each valve effects an operation of the switch to close the circuit in timed relation to relative movement of the electrodes of the associated welding device into engagement with the work, and means for opening the switch after a predetermined interval of time elapses.

32. In electric welding equipment, a plurality of welding units having relatively movable electrodes arranged in an electric circuit, means for successively supplying fluid under pressure to the welding units, means responsive to the fluid pressure supplied to the welding units to relatively move the electrodes into engagement with the work, a fluid pressure supply line, a switch in the circuit to the electrodes and operated by fluid pressure from the supply line to control the circuit in timed relation to relative movement of the electrodes into and out of engagement with the work, a valve associated with each of the welding units and effective to control communication between the supply line and switch, said valves being successively movable to their open positions by the fluid pressure admitted to the welding units so that each valve effects an operation of the switch to close the circuit in timed relation to relative movement of the electrodes of the associated welding device into engagement with the work, means for opening the switch after a predetermined interval of time elapses, and means also operated by fluid pressure from the supply line to exhaust the switch after each operation of the latter to open the circuit to the electrodes.

HENRY THOMAS PLATZ.